Z. G. LEIGH.
VEHICLE MUD CLEANER.
APPLICATION FILED JUNE 9, 1910.

983,502.

Patented Feb. 7, 1911.

Witnesses

Inventor
Z. G. Leigh
By
Attorneys

THE NORRIS PETERS CO., WASHINGTON, D. C.

UNITED STATES PATENT OFFICE.

ZACHARIAH G. LEIGH, OF MOUNT HOPE, ALABAMA.

VEHICLE MUD-CLEANER.

983,502.

Specification of Letters Patent. Patented Feb. 7, 1911.

Application filed June 9, 1910. Serial No. 566,117.

*To all whom it may concern:*

Be it known that I, ZACHARIAH G. LEIGH, a citizen of the United States, residing at Mount Hope, in the county of Lawrence, State of Alabama, have invented certain new and useful Improvements in Vehicle Mud-Cleaners; and I do hereby declare the following to be a full, clear, and exact description of the invention, such as will enable others skilled in the art to which it appertains to make and use the same.

This invention relates to vehicles and has special reference to a device for cleaning the mud from the wheels of a vehicle.

One object of the invention is to provide a device of this character which will not only clean the mud from the rim of the wheel but will also prevent mud from being carried up by the spokes and dropped on the hub in such manner that it will get into the journal box of the wheel and injure the same.

With the above and other objects in view, as will be hereinafter apparent, the invention consists in general of a cleaning device of novel construction secured to the axle of a vehicle and arranged to remove mud from the rim, spokes and hub of a wheel.

The invention further consists in certain novel details of construction and combinations of parts hereinafter fully described, illustrated in the accompanying drawings, and specifically set forth in the claim.

Figure 1:
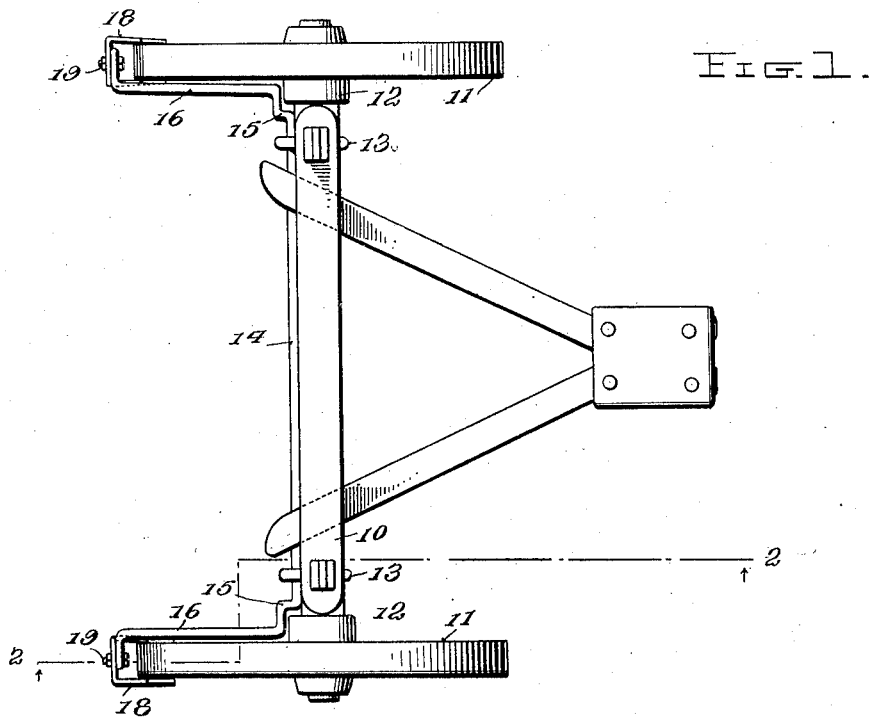
Figure 2:
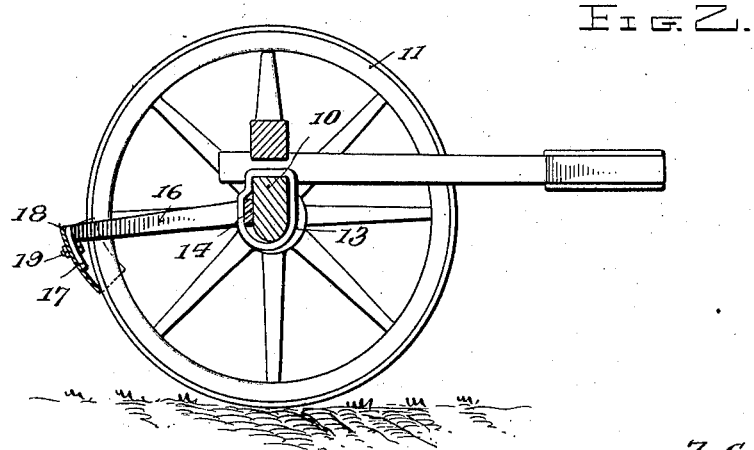

In the accompanying drawings, like characters of reference indicate like parts in the several views, and:—Figure 1 is a plan view of the rear part of the running gear of a vehicle showing the device applied thereto. Fig. 2 is a section on the line 2—2 of Fig. 1.

While the rear running gear has been here shown it will be obvious that the device may be applied equally well to the front running gear and to this end the parts described are intended to be taken as either those of the rear or front running gear of the vehicle.

The vehicle is provided with the usual axle 10 whereon are mounted wheels 11 provided with hubs 12. Around the axle extend bands 13 and through these bands passes a bar 14 which is provided with angled portions 15 so arranged that they lie close to the sides and inner ends of the hubs 12. This bar is continued at both ends in a direction substantially parallel to the wheels 11 as indicated at 16 and the extremities of the portions 16 are provided with feet 17 which extend over the rims of said wheels. To these feet are secured U-shaped scrapers 18, the scrapers being held to the feet by suitable bolts 19. These scrapers engage against the rims and sides of said wheels and are preferably arranged at an angle to the peripheries of the wheels as clearly shown in Fig. 2. It is to be noted that not only do the bights of the scrapers rest against the rims at an angle to the peripheries but the ends of the flanges of said scrapers are also disposed at an angle thereto. The purpose of this arrangement is to insure the mud carried up by the sides of the wheels being pushed off instead of accumulating against the scraper as would be the case were these ends arranged radially of the wheel.

In the operation of this device any mud which may be gathered by the rim of the wheel will be effectually removed by the scraper while the mud taken up by the spokes and projecting in lumps outside of the wheel will be struck by the portions 16 and knocked off of said spokes, the remaining mud falling harmlessly on the centers of the hubs 12. Furthermore, if the mud accumulates on the centers of these hubs that portion which is pushed off toward the inside will be removed by the angled portions 15 of the bar.

There has thus been provided a simple and efficient device of the kind described and for the purpose specified.

Having thus described the invention, what is claimed as new, is:—

In a mud cleaner for vehicle wheels the combination of a vehicle axle, wheels supported thereon and each provided with a hub, a continuous unbroken bar having a central portion extending along the rear of and secured to said axle, said bar being continued on each side of the central portion to conform closely to the outline of portions of said hubs and embrace said portions unbrokenly, the last mentioned portions being continued to form terminal portions lying throughout their extent close to the inner side of the respective wheels and having their inner faces at uniform distances from the wheels throughout, and scrapers attached to the extremities of the terminal portions and engaging against the rims and sides of the wheels.

In testimony whereof, I affix my signature, in presence of two witnesses.

ZACHARIAH G. LEIGH.

Witnesses:
I. T. COUNTS,
W. J. USSERY.